United States Patent
Duda

(10) Patent No.: US 11,757,715 B2
(45) Date of Patent: *Sep. 12, 2023

(54) MULTI-CLUSTER MANAGEMENT PLANE FOR NETWORK DEVICES

(71) Applicant: Arista Networks, Inc., Santa Clara, CA (US)

(72) Inventor: Kenneth James Duda, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 199 days.

This patent is subject to a terminal disclaimer.

(21) Appl. No.: 16/953,990

(22) Filed: Nov. 20, 2020

(65) Prior Publication Data

US 2021/0099343 A1 Apr. 1, 2021

Related U.S. Application Data

(63) Continuation of application No. 16/281,713, filed on Feb. 21, 2019, now Pat. No. 10,880,166.

(51) Int. Cl.
*H04L 41/0816* (2022.01)
*H04L 43/065* (2022.01)
*H04L 41/22* (2022.01)
*H04L 41/046* (2022.01)
(Continued)

(52) U.S. Cl.
CPC ........ *H04L 41/0816* (2013.01); *H04L 41/046* (2013.01); *H04L 41/12* (2013.01); *H04L 41/22* (2013.01); *H04L 43/065* (2013.01); *H04L 43/08* (2013.01)

(58) Field of Classification Search
CPC ....... G06F 16/9577; G06F 2009/45595; G06F 40/103; G06F 40/106; G06F 40/109; G06F 40/14; G06F 9/45558; G06F 2009/45587; H04L 41/12; H04L 43/0858; H04L 43/106; H04L 63/1433; H04L 63/1441; H04L 67/10; H04L 41/0816; H04L 41/046; H04L 41/22; H04L 43/065; H04L 43/08

See application file for complete search history.

(56) References Cited

U.S. PATENT DOCUMENTS

| | | |
|---|---|---|
| 7,299,237 B1 | 11/2007 | Clark et al. |
| 7,586,929 B2 | 9/2009 | Mizutani et al. |
| 7,774,440 B1 | 8/2010 | Bagrodia et al. |

(Continued)

FOREIGN PATENT DOCUMENTS

| | | |
|---|---|---|
| CN | 1490979 A | 4/2004 |
| CN | 101553797 A | 10/2009 |

OTHER PUBLICATIONS

Extended European Search Report issued in corresponding European Application 17172549.2, dated Oct. 25, 2017 (12 pages).

*Primary Examiner* — Ninos Donabed
(74) *Attorney, Agent, or Firm* — Sprinkle IP Law Group

(57) ABSTRACT

A method for managing networking devices. The method includes receiving, by a second management system, first network device state information (NDSI) for a first plurality of network devices, where the first NDSI is obtained by a first management system and where the first management system manages the first plurality of network devices. The method further includes initiating performance of a management action based on a result, wherein the result is obtained by processing at least the first NDSI.

18 Claims, 8 Drawing Sheets

(51) Int. Cl.
*H04L 41/12* (2022.01)
*H04L 43/08* (2022.01)

(56) References Cited

U.S. PATENT DOCUMENTS

| | | | |
|---|---|---|---|
| 8,291,468 B1 | 10/2012 | Chickering | |
| 8,667,394 B1* | 3/2014 | Spencer | G06F 16/93 |
| | | | 715/224 |
| 8,874,719 B1 | 10/2014 | Burnett et al. | |
| 9,003,292 B2* | 4/2015 | Smith | H04L 41/22 |
| | | | 715/733 |
| 9,183,662 B1* | 11/2015 | Sams | G06T 1/20 |
| 9,218,691 B1* | 12/2015 | Sams | G06F 9/44542 |
| 9,235,802 B1 | 1/2016 | Chamness et al. | |
| 9,348,834 B2* | 5/2016 | Bhagavan | G06F 16/1744 |
| 9,461,877 B1 | 10/2016 | Nadeau et al. | |
| 9,495,652 B1* | 11/2016 | Cook | G06Q 30/0201 |
| 9,697,172 B1 | 7/2017 | Somohano et al. | |
| 10,003,629 B2 | 6/2018 | Pech et al. | |
| 10,187,286 B2 | 1/2019 | Sigoure | |
| 10,638,202 B1* | 4/2020 | Khisti | H04N 21/41265 |
| 2004/0015609 A1 | 1/2004 | Brown et al. | |
| 2004/0255028 A1* | 12/2004 | Chu | H04L 63/0272 |
| | | | 709/227 |
| 2004/0267916 A1 | 12/2004 | Chambliss et al. | |
| 2005/0204028 A1 | 9/2005 | Bahl et al. | |
| 2006/0020527 A1* | 1/2006 | Bhally | G06Q 10/06 |
| | | | 705/35 |
| 2006/0036527 A1* | 2/2006 | Tinnirello | G06Q 40/08 |
| | | | 705/35 |
| 2006/0041494 A1* | 2/2006 | Tinnirello | G06Q 10/10 |
| | | | 705/35 |
| 2006/0041660 A1 | 2/2006 | Bishop et al. | |
| 2006/0085507 A1 | 4/2006 | Zhao et al. | |
| 2007/0226630 A1* | 9/2007 | Farid | H04L 12/4641 |
| | | | 715/734 |
| 2008/0089237 A1 | 4/2008 | Molen et al. | |
| 2009/0172148 A1 | 7/2009 | Underwood | |
| 2009/0228586 A1 | 9/2009 | Claise et al. | |
| 2011/0004621 A1* | 1/2011 | Kelley | G06Q 10/06 |
| | | | 707/769 |
| 2012/0130651 A1* | 5/2012 | Papadimitriou | G01N 27/9046 |
| | | | 702/35 |
| 2013/0060487 A1* | 3/2013 | Papadimitriou | G10L 15/22 |
| | | | 702/34 |
| 2013/0235870 A1 | 9/2013 | Tripathi et al. | |
| 2014/0052949 A1* | 2/2014 | Wang | G06F 3/0619 |
| | | | 711/162 |
| 2014/0075004 A1* | 3/2014 | Van Dusen | G06N 20/00 |
| | | | 709/223 |
| 2014/0075327 A1 | 3/2014 | Noel et al. | |
| 2014/0269319 A1 | 9/2014 | DeCusatis et al. | |
| 2014/0337467 A1 | 11/2014 | Pech et al. | |
| 2015/0074260 A1* | 3/2015 | Anand B.S | H04L 41/12 |
| | | | 709/224 |
| 2015/0092561 A1 | 4/2015 | Sigoure | |
| 2015/0100675 A1 | 4/2015 | Davie et al. | |
| 2015/0277953 A1* | 10/2015 | Xu | G06F 9/45558 |
| | | | 718/1 |
| 2015/0358200 A1 | 12/2015 | Mahajan et al. | |
| 2015/0358209 A1 | 12/2015 | Zhang et al. | |
| 2016/0057052 A1 | 2/2016 | Zhang et al. | |
| 2016/0154907 A1* | 6/2016 | Halabe | G06F 30/20 |
| | | | 703/7 |
| 2016/0277272 A1* | 9/2016 | Peach | H04L 43/0858 |
| 2016/0373302 A1 | 12/2016 | Sigoure | |
| 2017/0004221 A1 | 1/2017 | Olsen | |
| 2017/0145061 A1* | 5/2017 | Lu | C07K 14/5428 |
| 2017/0250951 A1 | 8/2017 | Wang et al. | |
| 2017/0339002 A1 | 11/2017 | Sigoure et al. | |
| 2020/0274763 A1* | 8/2020 | Duda | H04L 41/34 |

* cited by examiner

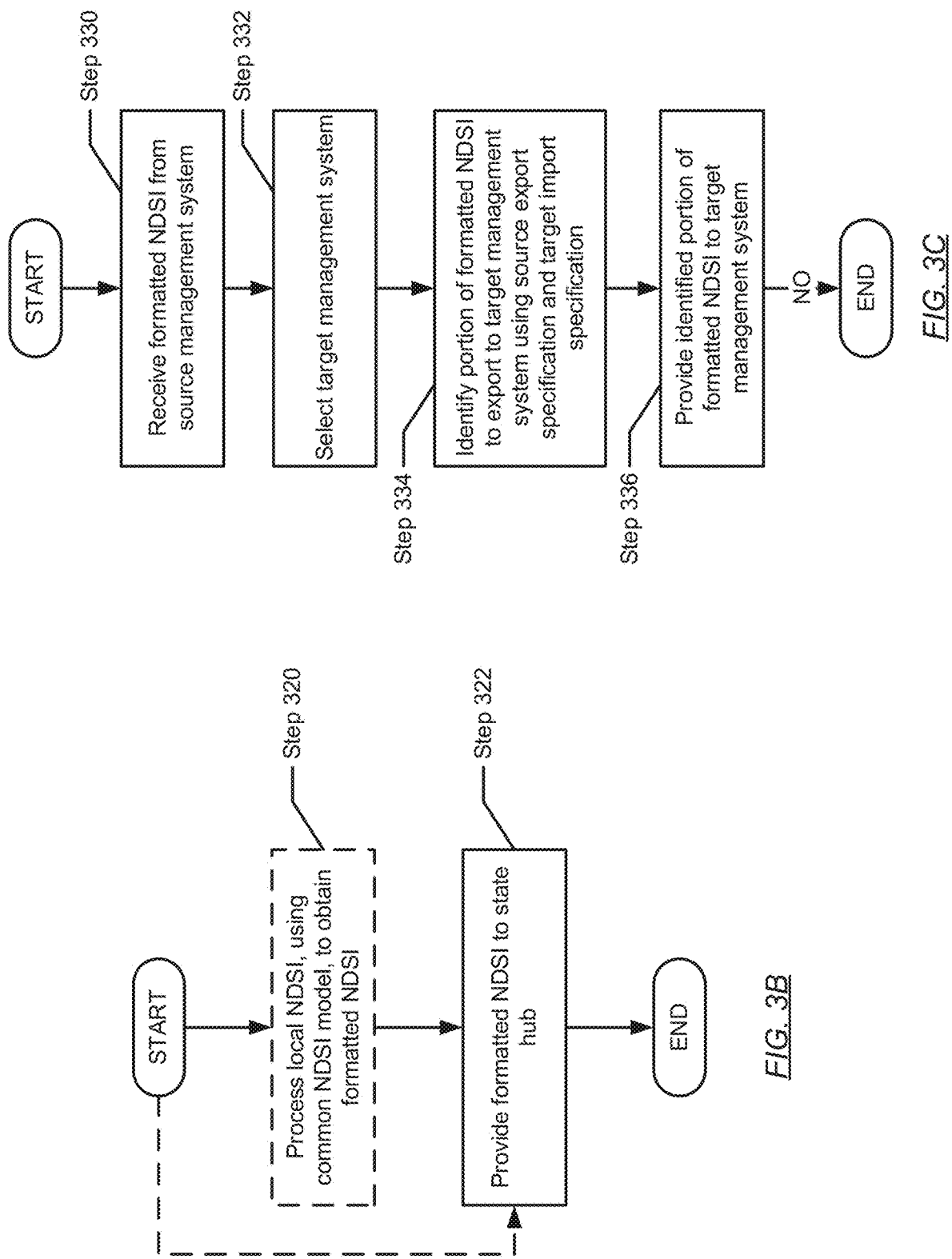

MULTI-CLUSTER MANAGEMENT PLANE FOR NETWORK DEVICES

CROSS-REFERENCE TO RELATED APPLICATION(S)

This application is a continuation of, and claims a benefit of priority under 35 U.S.C. 120 from, U.S. patent application Ser. No. 16/281,713, filed Feb. 21, 2019, issued as Pat. No. 10,880,166, entitled "MULTI-CLUSTER MANAGEMENT PLANE FOR NETWORK DEVICES," which is fully incorporated by reference herein for all purposes.

BACKGROUND

Modern networks typically include a large number network devices (e.g., switches, multilayer switches, and/or routers), each interacting with one or more other network devices. These modern networks are complex systems, which are difficult to configure and manage.

SUMMARY

In general, in one aspect, the invention relates to a method for managing networking devices. The method includes receiving, by a second management system, first network device state information (NDSI) for a first plurality of network devices, wherein the first NDSI is obtained by a first management system and wherein the first management system manages the first plurality of network devices, and initiating performance of a management action based on a result, wherein the result is obtained by processing at least the first NDSI.

In general, in one aspect, the invention relates to a management system. The management system includes a management system database comprising first network device state information (NDSI) for a first plurality of network devices managed by the management system wherein the management system is configured to receive second NDSI for a second plurality of network devices, wherein the second NDSI is obtained by a second management system and wherein the second management system manages the first plurality of network devices, and initiating performance of a management action on at least one of the first plurality of network devices based on a result, wherein the result is obtained by processing the first NDSI and the second NDSI.

In general, in one aspect, the invention relates to a non-transitory computer readable medium comprising instructions that, when executed by a processor, perform a method. The method includes receiving, by a second management system, network device state information (NDSI) for a first plurality of network devices, wherein the NDSI is obtained by a first management system and wherein the first management system manages the first plurality of network devices, and initiating performance of a management action based on a result, wherein the result is obtained by processing at least the NDSI.

Other aspects of the invention will be apparent from the following description and the appended claims.

BRIEF DESCRIPTION OF DRAWINGS

FIGS. 3B-3C shows a flowchart for exchanging network device state information using a state hub in accordance with one or more embodiments of the invention.

DETAILED DESCRIPTION

Figure 1A:
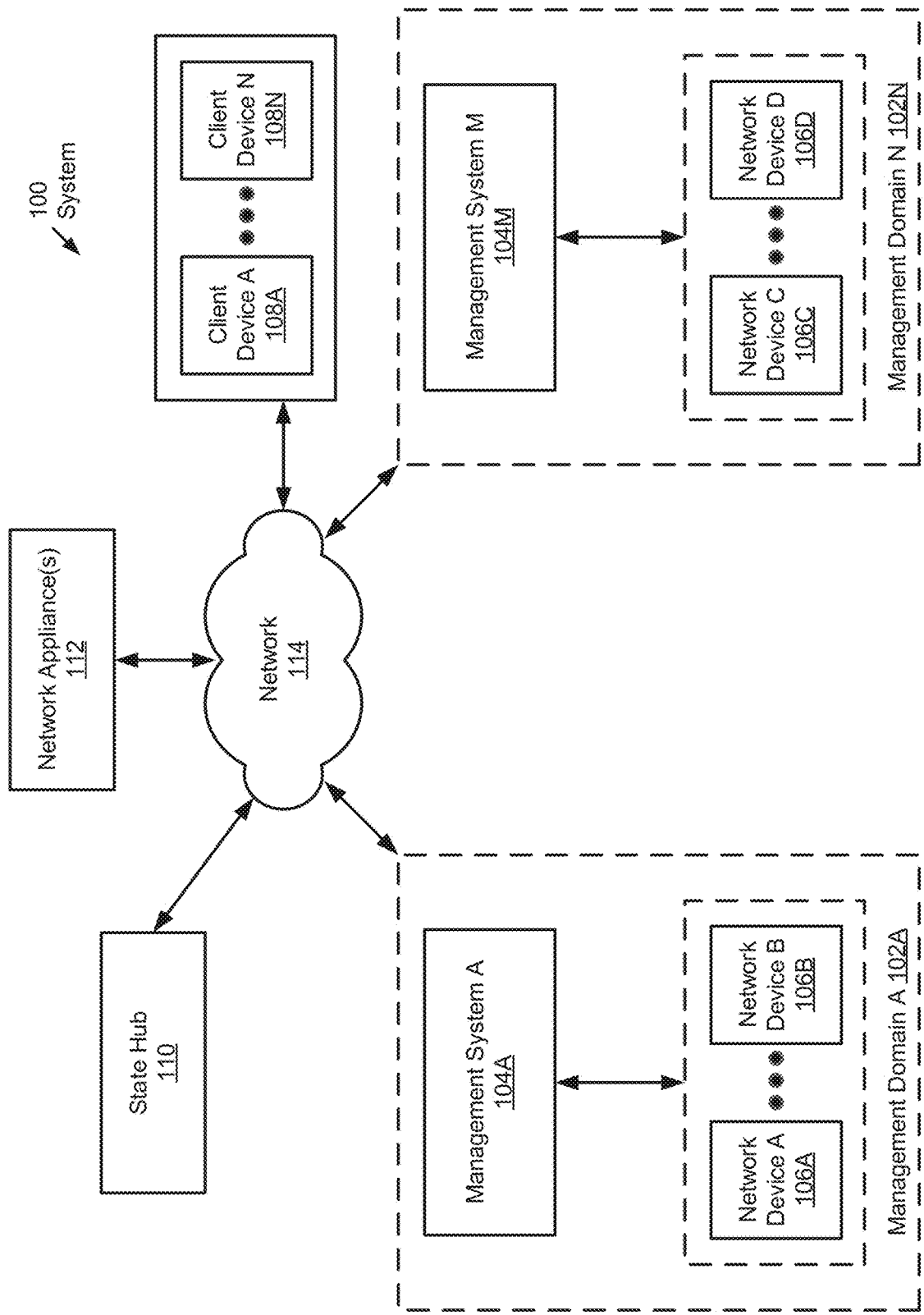
FIG. 1A shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a method and system for managing network devices. More specifically, embodiments of the invention relate to managing network devices across different management domains, where each of the management domains is managed by a specific management system. The set of management systems may be collectively referred to a multi-cluster management plane or a multi-domain management plane. The management systems may establish peering relationships with each other and/or with a state hub. Once the peering relationships have been established, the management systems may provide the network device state information (NDSI) (or portions thereof) that they have collected to other management systems. The sharing of NDSI between management systems may be facilitated by a common NDSI model (e.g., a common data model) (discussed below).

The sharing of NDSI between various management systems may enable and/or facilitate one or more of the following technological improvements: (i) NDSI from a first set of network devices that is learned/discovered by a first management system may be used by a second management system to configure a second set of network devices that are managed by the second management system; (ii) the functionality of a first management system may be used by a second management system (e.g., a topology visualizer in the first management system may be used to generate a topology visualization for a set of network devices managed by a second management system); and (iii) efficient distribution of NDSI obtained using a management system from a first vendor with a management system from a second vendor. Embodiments of the invention may be enable other technological improvements without departing from the invention.

FIG. 1A shows a system in accordance with one or more embodiments of the invention. The system (100) includes multiple management domains (102A, 102N) operatively connected to one or more client device(s) (108A, 108N), a state hub (110), and one or more network appliances (112) through a network (114). Each of these components is described below.

In one embodiment of the invention, each management domain (102A, 102N) includes one or more network devices (106A, 106B, 106C, 106D) and a management system (104A, 104M). The management system includes functionality to manage the network devices in the management domain. Though not shown in FIG. 1A, the components within the management domain may communicate over a network (e.g., a local area network, a wide area network, etc.). The management domain (102A, 102N) corresponds to set of network devices that are managed by a management system. The set of network devices that are part of a management domain may depend on, for example, a logical grouping of network devices, a geographic grouping of network devices, and/or a vendor-based grouping of network devices. The following is set of non-limiting examples of management domains.

Example 1

Consider a scenario in which a company has an engineering division and an operations division. In this scenario, there may be one management domain for the engineering division and another management domain for the operations division. The management domain for the engineering division may include all network devices that are used by the engineering division while the management domain for the operations division includes all network devices used by the operations division.

Example 2

Consider a scenario in which a company has a North American division and a European division. In this scenario, there may be one management domain for the North American division and another management domain for the European division. The management domain for the North American division may include all network devices that are used by the North American division while the management domain for the European division includes all network devices used by the European division.

Example 3

Consider a scenario in which a company has network devices from vender A and network devices from vendor B. In this scenario, there may be one management domain that includes only network devices from Vendor A along with a management system from Vendor A and another management domain that includes only network devices from Vendor B along with a management system from Vendor B.

Continuing with the discussion of FIG. 1A, in one embodiment of the invention, each management system (104A, 104M) may be implemented using one or more computing devices that manage network devices (e.g., 106A-106D106A-106D) in a particular management domain. In one embodiment of the invention, each computing device is any physical or virtual device that may be used for performing various embodiments of the invention. The physical device may correspond to any physical system (see e.g., FIG. 5) with functionality to implement one or more embodiments of the invention. For example, the physical device may be a server (i.e., a device with at least one or more processor(s), memory, and an operating system) that is directly (or operatively, e.g., via the network) connected to at least one client device (e.g., 108A, 108N) and at least network device (e.g., 106A-106D). In another example, the management system may be a network controller.

Alternatively, the physical device may be a special purpose computing device that includes one or more application-specific processor(s) (or hardware) configured to only execute embodiments of the invention. In such cases, the physical device may implement embodiments of the invention in hardware as a family of circuits and may retain limited functionality to receive input and generate output in accordance with various embodiments of the invention. In addition, such computing devices may use a state-machine to implement various embodiments of the invention.

In another embodiment of the invention, the physical device may correspond to a computing device that includes one or more general purpose processor(s) and one or more application-specific processor(s) (or hardware). In such cases, one or more portions of the invention may be implemented using the operating system and general purpose processor(s), while one or more portions of the invention may be implemented using the application-specific processor(s) (or hardware).

In one embodiment of the invention, the management system (104A, 104M) may be implemented using one or more virtual machines. Broadly speaking, virtual machines are distinct operating environments configured to inherit the underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architecture involving: (i) one or more virtual machines executing on a host computer system such that each virtual machine serves as a host to an instance of a guest operating system; and (ii) a hypervisor layer serving to facilitate intra-host communication between the one or more virtual machines and the host computer system hardware. Alternatively, one or more embodiments of the invention may be implemented on Xen® architectures involving: (i) a control host operating system (e.g., Dom 0) including a hypervisor; and (ii) one or more virtual machines (e.g., Dom U) executing guest operating system instances. VMware® is a registered trademark of VMware, Inc. Xen® is a trademark overseen by the Xen Project Advisory Board. In another embodiment of the invention, the management system (104A, 104M) may be implemented using one or more containers. A container is an isolated execution environment that executes on an operating system. Unlike virtual machines, which each execute on their own isolated operating system, containers execute on a single computing device share the same underlying operating system.

In one embodiment of the invention, the management system (104A, 104M) may be implemented using one or more virtual instances (e.g., one or more virtual machines or one or more containers) executing on a network device. In another embodiment of the invention, the management system may be implemented in one or more virtual instances executing on a server that is operatively (via the network) (or directly) connected to one or more client device(s) (e.g., 108A, 108N in FIG. 1A) and/or one or more network device(s).

In one embodiment of the invention, the management system (104A, 104M) includes hardware and/or software to enable the management system to perform the methods described below (see e.g., FIGS. 2-4). In one embodiment of the invention, the software may be in the form of executable instructions (stored in a non-transitory computer readable medium (not shown)), which when executed by a processor(s) (not shown), enable the management system(s) to perform the methods described below (see e.g., FIGS. 2-4). Additional detail about the management system is described below with respect to FIG. 1B.

In one embodiment of the invention, the one or more client device(s) (108A, 108N) may each be a computing device (see e.g., FIG. 5) or virtual instance (discussed above) that is configured to interact with the management system (104A, 104M) and/or the network devices (106A-106D). In one embodiment of the invention, a client device includes functionality to initiate and/or facilitate the setup of the management domains (see e.g., FIG. 2) and interact with the management systems for processing the received NDSI (see e.g., FIG. 4).

In one embodiment of the invention, the one or more network device(s) (106A-106D) are physical devices that include persistent storage, memory (e.g., random access memory), one or more processor(s) (including a switch chip), and two or more physical ports. In one embodiment of the invention, the switch chip is hardware that determines which egress port on a network device to forward media access control (MAC) frames. The switch chip may include egress and ingress ports that may connect to ports on the network device. Each port may or may not be connected to another device on a network device on the network (114) (e.g., a server, a switch, a router, etc.). The network device may be configured to receive packets via the ports and determine whether to: (i) drop the packet; (ii) process the packet in accordance with one or more embodiments of the invention; and/or (iii) send the packet, based on the processing, out another port on the network device.

How the network device makes the determination about whether to drop the packet, and/or send the packet to another device on the network depends, in part, on whether the network device is a layer-2 (L2) switch or a layer-3 (L3) switch (also referred to as a multilayer switch), which may perform at least some functions of a router. If the network device is operating as a L2 switch, the network device uses the destination MAC address along with a forwarding table to determine out of which port to send the packet. If the network device is operating as a L3 switch, the network device uses the destination Internet Protocol (IP) address along with a routing table to determine out of which port to send the packet, and includes the ability to write the MAC address of the next device to receive the packet in place of its own MAC address (which the last device to send the packet wrote) in the L2 information encapsulating the packet. If the network device is a multilayer switch, the multilayer switch includes functionality to process packets using both MAC addresses and IP addresses.

In one embodiment of the invention, the persistent storage in the network device may include any type of non-transitory computer readable medium that includes instructions, which, when executed by one or more processor(s) in the network device, enable the network device to perform functions described below in accordance with one or more embodiments of the invention (see e.g., FIGS. 2-4).

Examples of network devices include, but are not limited to, a router, a switch, and a multilayer switch. The network device is not limited to the aforementioned specific examples. Additional detail about a network device is described below with respect to FIG. 1C.

In one embodiment of the invention, the state hub (110) includes functionality to: (i) distribute import and export specifications of the management systems (see e.g., FIG. 1B, FIG. 2) and (ii) receive NDSI from source management systems and provide all or at least a portion (based on the appropriate import and export specifications) of the NDSI to one or more target management systems (see e.g., FIGS. 3B, 3C). Additional detail about the operation of the state hub is provided below in FIGS. 2-4.

In one embodiment of the invention, the state hub (110) may be implemented using any combination of the following: one or more computing devices (see e.g., FIG. 5), one or more special-purpose computing devices (described above), one or more computing devices that includes one or more general purpose processors, one or more application-specific processors (or hardware) (described above), one or more virtual machines (described above), and one or more containers (described above).

In one embodiment of the invention, a network appliance (112) is a specialized device that is used by one or more of the network devices and/or management systems. Examples of network appliances include, but are not limited to, firewalls, domain name servers, and network attached storage The network appliance may communicate with the one or more network devices, management systems, and/or client devices using, e.g., application programming interfaces (APIs) exposed by the network application (see e.g., FIG. 4).

In one embodiment of the invention, the network appliance (112) may be implemented using any combination of the following: one or more computing devices (see e.g., FIG. 5), one or more special-purpose computing devices (described above), one or more computing devices that includes one or more general purpose processors, one or more application-specific processors (or hardware) (described above), one or more virtual machines (described above), and one or more containers (described above).

In one or more embodiments of the invention, network appliance may be: (i) external (i.e., located outside) the management domains(s), (ii) located inside a management domain and implemented as a computing device (or other physical device), (iii) located inside a management domain and implemented as a virtual instance on the management system in the management domain, and (iv) located inside a management domain and implemented as a virtual instance on a network device in the management domain.

In one embodiment of the invention, each management domain may include its own network appliance(s) (which may be implemented as physical devices (described above) or virtual instances). Further, these network appliances may be managed by a network appliance system (not shown). In such scenarios, the network appliance system may include functionality to receive (via one or more APIs) commands, data, and/or requests from one or more management systems and, based on receipt of the aforementioned information, initiate and/or coordinate the configuration of one or more network appliances located across the various management domains. In this manner, the network appliance system may serve as a single point of management for the network appliances across multiple management domains.

In one embodiment of the invention, the network (114) may be the medium through which the components in the management domains (104A, 104M), the client device(s) (108A, 108N), the state hub (110), and the network appliances (112) are operatively connected. In one embodiment of the invention, the network may include other network devices (or systems) (not shown) that facilitate communication between the aforementioned components. As such, in one embodiment of the invention, the network may include any combination of local and/or wide area (e.g., Internet) network segments that may be wire-based and/or wireless and that may use any combination of wired and/or wireless communication protocols.

Figure 1B:
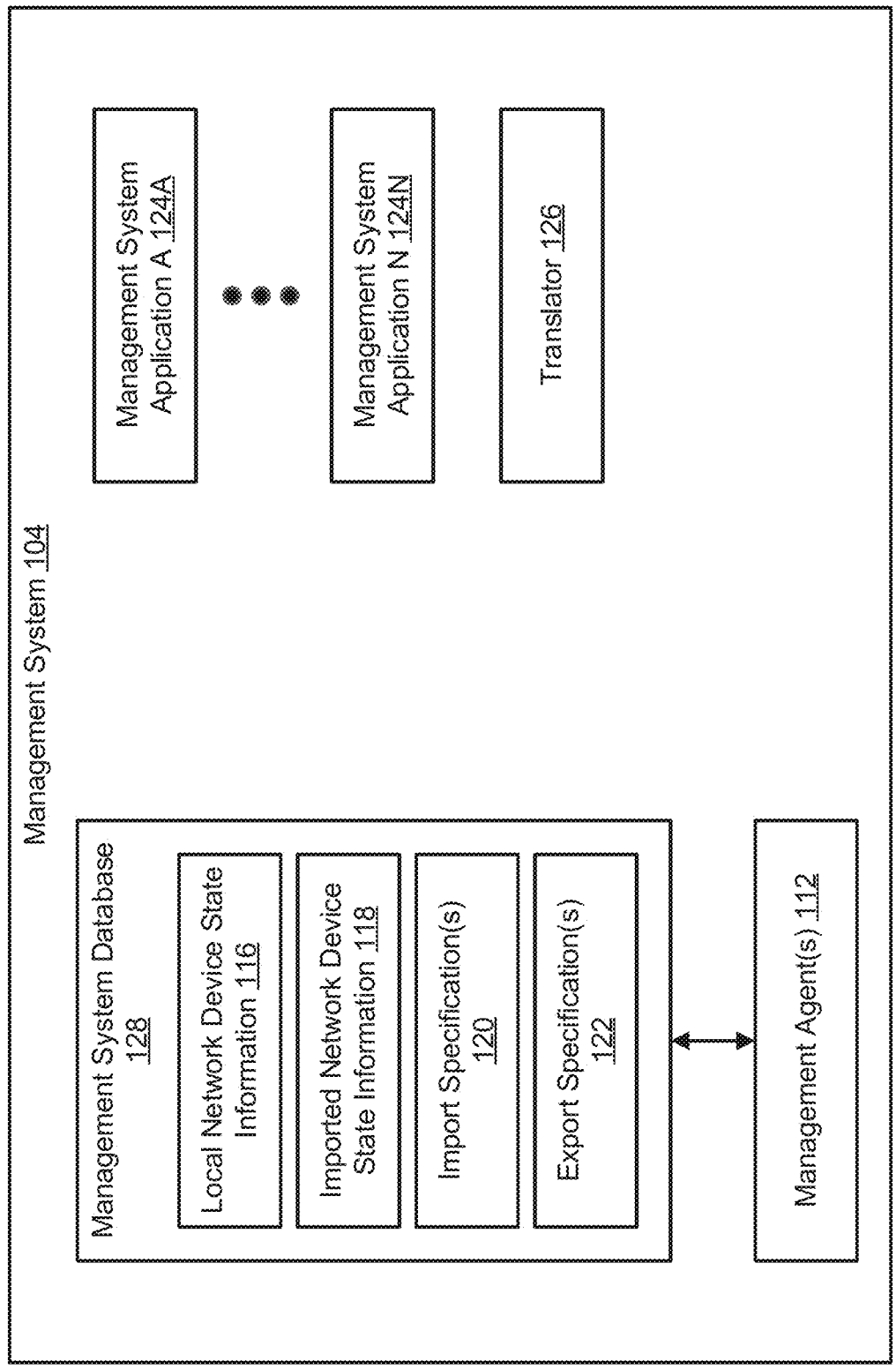
FIG. 1B shows a management system in accordance with one or more embodiments of the invention.

FIG. 1B shows a management system in accordance with one or more embodiments of the invention. The management system (104) includes a management system database (128), one or more management agents (112), one or more management system applications (124A 124P), and a translator (126). Each of these components is described below.

In one embodiment of the invention, the management system database (128) includes local network device state information (NDSI) (116), imported NDSI (118), one or more import specifications (120), and one or more export specifications (122).

In one embodiment of the invention, the local NDSI (116) includes the state of each of the network devices (see e.g., 106A-106D in FIG. 1A) which the management system (104A, 104M) manages. Said another way, the management system database may serve as a repository to consolidate state information pertaining to each of the network devices under the supervision of the management system. The aforementioned information may be collectively referred to as network device state information (NDSI). In one embodiment of the invention, the NDSI for a network devices may include, but is not limited to: (i) state information that has been provided to the management system by the network device and (ii) the state information associated with the network device that is obtained from an external source. In one embodiment of the invention, the external source may correspond to, but is not limited to, another management system (i.e., a management system that is different than the management system that is managing the network device at issue), a network appliance, a state hub, and/or a client device.

Figure 1C:
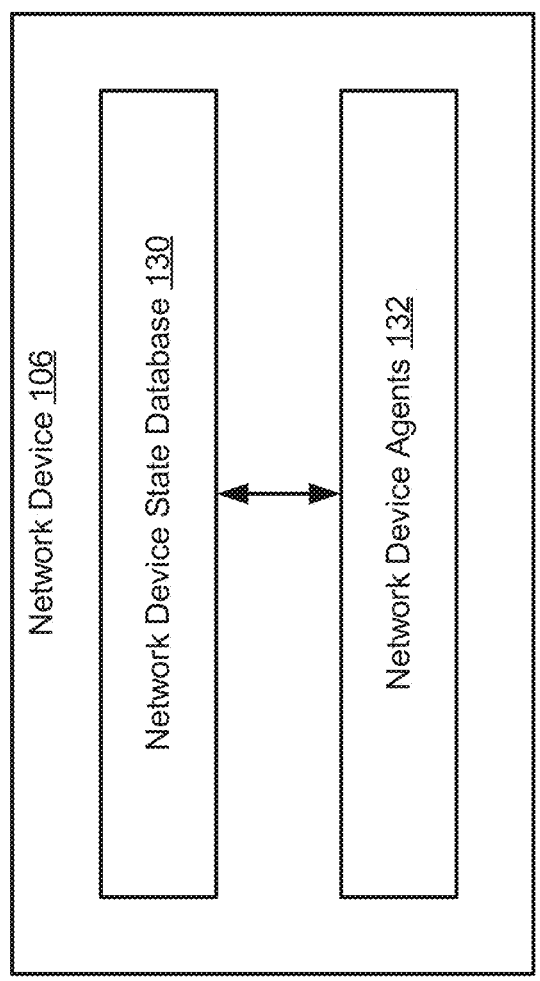
FIG. 1C shows a network device in accordance with one or more embodiments of the invention.

Continuing with the discussion of FIG. 1C, the state of a network device (as specified by the NDSI in the network device state database (see e.g., 130 in FIG. 1C)) and the state of the network device maintained in the management system database (i.e., the NDSI for the network device) may be different. The aforementioned differences may be the result of state changes that have been made on the network device that have not been propagated to the management system and/or state changes that have been made in the management system but have not yet been set (or otherwise propagated to) the network device.

In one embodiment of the invention, the imported NDSI (118) may include the state associated with network devices that are managed by the management system as well as the state of network devices that are not managed by the management system. Specifically, the imported NDSI (118) include NDSI that is obtained from other management systems (see e.g., FIGS. 3A-4). The specific NDSI imported from other management systems may satisfy the import specification (120) of the management system (i.e., the management system in which the management system database is located) and the export specification (122) of the management system from which the NDSI was obtained. Additional detail about the import and export specifications is provided below. If the management system is importing NDSI from multiple other management systems, then the imported NDSI may be labeled and/or tagged in order to identify the source of the imported NDSI. For example, the label or tag may identify the management domain as well the individual network device with which the NDSI is associated.

In one embodiment of the invention, the state information, which may be included as part of either the local NDSI (116) or the imported NDSI (118) that is stored in the management system database (128), may include, but is not limited to: (i) information about (and/or generated by) all (or a portion of) services currently executing on the network device(s); (ii) the version of all (or a portion of) software executing on the network device(s); (iii) the version of all (or a portion of) firmware on the network device(s); (iv) hardware version information for all (or a portion of) hardware in the network device(s); and (v) information, for one or more network devices, about all (or some) of the services, protocols, and/or features configured on the network device (e.g., show command service (SCS), multi-chassis link aggregation (MLAG), link aggregation control protocol (LACP), virtual extensible local area network (VXLAN), link layer discovery protocol (LLDP), tap aggregation, data center bridging (DCB) capability exchange, access control list (ACL), virtual local area network (VLAN), virtual router redundancy protocol (VRRP), virtual address resolution protocol (VARP), spanning tree protocol (STP), open shortest path first (OSPF), border gateway protocol (BGP), routing information protocol (RIP), bidirectional forwarding detection (BFD), multi-protocol label switching (MPLS), protocol independent multicast (PIM), Internet control message protocol (ICMP), Internet group management protocol (IGMP), etc.), where this information may include information about the current configuration and status of each of the services, protocols, and/or features. In one embodiment of the invention, the management system database may include control plane state information associated with the control plane of the network device (e.g., the current list of static routes, current contents of the routing information base (RIB), the current content of the link state database, the current contents of the neighbor table, etc.). Further, in one embodiment of the invention, the management system database may include data plane state information associated with the data plane of the network device (e.g., the current contents of the forwarding information base (FIB)). The management system database may include other information (including other state information) without departing from the invention.

In one embodiment of the invention, the imported NDSI (118) may include state that is generated by, e.g., a management system and/or management system application for a given network device. This state may (but is not required to) be used to configure at least a portion of the network device. See e.g., FIG. 4.

Continuing with the discussion of FIG. 1B, in one embodiment of the information, the local and/or imported NDSI may be stored with a timestamp. The use of the timestamp, in combination with the NDSI, may be used to determine the state of the system, management domain, or a given network device(s) in the system at specific points in time.

In one embodiment of the invention, the state information in the management system may be shared by the management system, with one or more network devices, using an asynchronous replication mechanism. More specifically, when state information is changed in the management system, the changed state information is first stored in the management system database, and then a copy of the changed state information is transmitted to the one or more network device(s) or the state hub. The transmission of the state information to the one or more network devices or the state hub may involve pushing the updated state information, by one of the management agents (112), to the one or more network devices or the state hub. Additionally, or alternatively, the transmission of the state information to the one or more network devices may involve sending a notification, by one of the management agents (112), to the one or more network devices. In response to receiving the notification, a network device agent (132) subsequently pulls the updated state information from the management system database.

In one embodiment of the invention, the management system may only import certain NDSI from other management systems. An import specification (120) may be used to identify which NDSI the management system will import. The import specification may be a global import specification, i.e., a single import specification that is used by the management system for all NDSI importation, or it may be a per-management system (or set of management systems) import specification, i.e., different import specifications are used for different management systems (or sets of management systems).

Similarly, the management system may only export certain local NDSI to other management systems. An export specification (122) may be used to identify which NDSI the management system will export. The export specification may be a global export specification, i.e., a single export specification that is used by the management system for all NDSI exporting, or it may be a per-management system (or set of management systems) export specification, i.e., different export specifications are used for different management systems (or sets of management systems).

In one embodiment of the invention, the import specification and the export specification may include data elements, where each data element specifies a specific-type of NDSI (e.g., version of software executing the network device) and/or groups/categories of NDSI (e.g., all information related to the border gateway protocol (BGP) implementation on the network device, or all control plane information for the network device). The NDSI specified in the import and export specifications may vary based on the implement of the invention.

In order to facilitate efficient exchange of import and export specifications between the various management systems, the import and export specifications may follow a common NDSI model (e.g., a common format, schema, or data model). In such embodiments, the various management systems include functionality to process import and export specifications based on the common NDSI model.

In one embodiment of the invention, the common NDSI model may be based on or be an extension of the OpenConfig data models. The OpenConfig data models include vendor-neutral data models that are used to represent the configuration and/or state of an individual network device. However, the current OpenConfig data models do not contemplate multi-network device systems or the relationships between the network devices in such a system. The extended OpenConfig data models that may be used in one or more embodiments of the invention enable identification of individual network devices and the ability to define the relationships (which may be physical or logical) between the individual network devices. In the extended OpenConfig model, the physical relationships may specify how the individual network devices are physically connected to each other while the logical relationships may specify, e.g., which network devices are associated with a given VXLAN Network Identifier (VNI). Those skilled in the art will appreciate that the invention is not limited to the above examples.

In one embodiment of the invention, the management system database (128) may also include import specifications and/or export specification for other management systems. These import and/or export specifications may be obtained when the peering relationships are established (see e.g., FIG. 2). In such scenarios, the import and export specifications may also include information that uniquely identifies the import and/or export specification and/or uniquely identifies the management system with which the import and/or export specification is associated. The import and/or export specifications may include other information without departing from the invention.

In one embodiment of the invention, the management system exports its local NDSI and/or imports external NDSI that is formatted in accordance with the common NDSI model. Depending on the implementation, the imported NDSI may be stored in the management system database (128) in the common NDSI format or in local format (i.e., a format that is supported by the management system database). In the latter scenario, a translator (126) may be used to: (i) reformat the imported NDSI, which is in a common NDSI format, into a local format and/or (ii) reformat the local NDSI, which is in a local format, into the common NDSI format prior to the local NDSI being exported to another management system. The translator (126) may correspond to specialized software and/or hardware components in the management system that are used to perform the aforementioned reformatting. In other embodiments of the invention, the local NDSI may be stored in the management system database in a local format while the imported NDSI may be stored in accordance with the common NDSI model.

In another embodiment of the invention, the imported NDSI may be initially stored in the common NDSI format. The translator may then process to imported NDSI to generate a copy of the imported NDSI in the local format, which is subsequently stored. In this embodiment, there may be two copies of the NDSI one in the common NDSI format and another in the local format.

Continuing with the discussion of FIG. 1B, in one embodiment of the invention, the management system database (128) may be implemented using any type of database (e.g., a relational database, a distributed database, etc.). Further, the management system database may be implemented in-memory (i.e., the contents of the management system database may be maintained in volatile memory). Alternatively, the management system database may be implemented using persistent storage. In another embodiment of the invention, the management system database may be implemented as an in-memory database with a copy of the management system database being stored in persistent storage. In such cases, as changes are made to the in-memory database, copies of the changes (with a timestamp) may be stored in persistent storage. The use of an in-memory database may provide faster access to the contents of the management system database.

Those skilled in the art will appreciate that while the term "database" is used above, the management system database (128) may be implemented using any known or later developed data structure(s) to manage and/or organize the content in the management system database.

In one embodiment of the invention, the management agent(s) (112) interacts with the management system database (128). Each management agent facilitates the implementation of one or more protocols, services, and/or features of the management system (104A, 104M). Examples of management agents, include, but are not limited to, a bug-alerts agent, a policy agent that manages access control lists, a user interface agent, a routing information base agent, a forwarding information base agent, and a simple network management protocol (SNMP) agent. Furthermore, each management agent may include functionality to access various portions of the management system database (128) in order to obtain the relevant portions of the state of one or more network device(s) (i.e., NDSI) in order to perform various functions. Additionally, each management agent may include functionality to update the state of the one or more network device(s) by writing new and/or updating values in the management system database, corresponding to one or more variables and/or parameters that are currently specified in the one or more network device(s).

One or more of the management agents (112) may also include functionality to detect the aforementioned changes to the management system database and propagate (or initiate propagation of) these changes to the appropriate network device(s).

Figure 4:
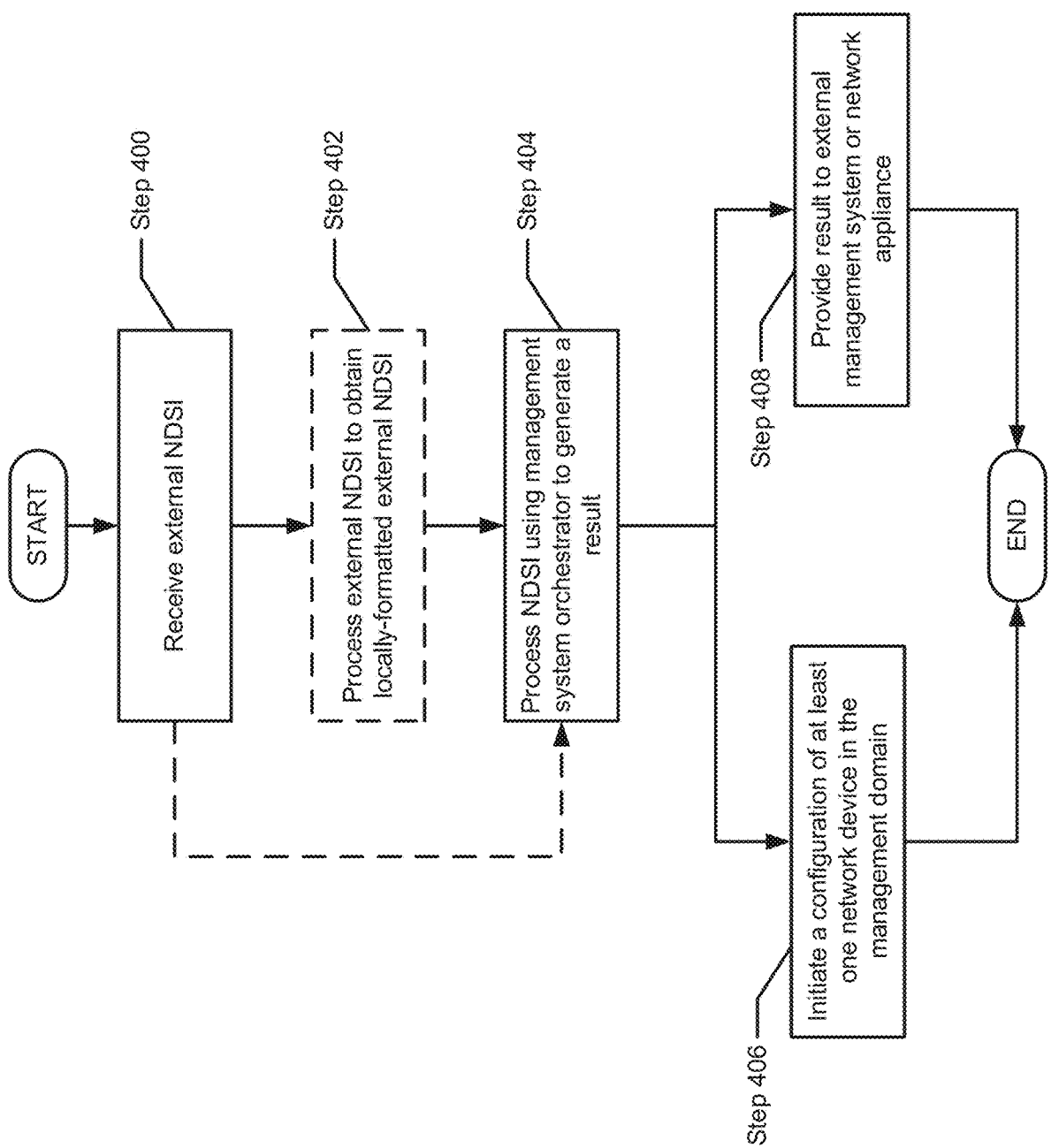
FIG. 4 shows a flowchart for processing network device state information in accordance with one or more embodiments of the invention.

In one embodiment of the invention, the management system applications (124A, 124P) correspond to specialized software and/or hardware components in the management system used to analyze the NDSI and generate a result (see e.g., FIG. 4). The management system applications may correspond to vendor specific software or hardware that is used to analyze a particular type(s) of NDSI and/or perform a particular type of analysis on the NDSI. The following examples of management system applications are included for illustrative purposes only and are not intended to limit the invention.

Turning to the examples, one management system application may be a topology visualizer. The topology visualizer includes functionality analyze the NDSI in order to generate a visualization (i.e., a graphical representation) of all or a portion of the system and/or all or a portion of the management domain. The visual representation may include nodes (each representing a network device, a client device, a management system, a network appliance, or any other physical or logical element in the system or management domain) along with one or more lines (or edges) connecting the nodes, where each line (or edge) may represent a relationship between the nodes connected by the line. The visual representation may also include a color scheme and/or overlays, which are used to convey additional information to a user.

In another example, the management system application may be a firewall configurer. The firewall configurer includes functionality obtain the server to port mappings (i.e., ports on the network device) across multiple management domains as well as obtain specific firewall rules to be used in the system (e.g., from an administrator using a client device or from a firewall). Using this information, the firewall configurer may determine which groups of servers may communicate with each other. Based on this analysis, the firewall configurer may then send specific configuration instructions to a firewall (e.g., represented by the network appliance in FIG. 1A) via an API exposed by the firewall.

FIG. 1C shows a network device in accordance with one or more embodiments of the invention. The network device (106) includes a network device state database (130) and one or more network device agents (122). Each of these components is described below.

In one embodiment of the invention, the network device state database (116) includes the current state of the network device (108). The state information stored in the network device state database may include, but is not limited to: (i) information about (and/or generated by) all (or a portion of the) services currently executing on the network device; (ii) the version of all (or a portion of the) software executing on the network device; (iii) the version of all firmware on the network device; (iv) hardware version information for all (or a portion of the) hardware in the network device; (v) information about the current state of all (or a portion of the) tables (e.g., routing table, forwarding table, etc.) in the network device that are used to process packets, where information may include the current entries in each of the tables, and (vi) information about all (or a portion of the) services, protocols, and/or features configured on the network device (e.g., show command service (SCS), MLAG, LACP, VXLAN, LLDP, tap aggregation, data center bridging capability exchange, ACL, VLAN, VRRP, VARP, STP, OSPF, BGP, RIP, BDF, MPLS, PIM, ICMP, IGMP, etc.), where this information may include information about the current configuration and status of each of the services, protocols, and/or features. In one embodiment of the invention, the network device state database includes control plane state information (discussed above) associated with the control plane of the network device. Further, in one embodiment of the invention, the network device state database includes data plane state information (discussed above) associated with the data plane of the network device. The network device state database may include other information without departing from the invention.

In one embodiment of the invention, the network device state database (130) may be implemented using any type of database (e.g., a relational database, a distributed database, etc.). Further, the network device state database may be implemented in-memory (i.e., the contents of the network device state database may be maintained in volatile memory). Alternatively, the network device state database may be implemented using persistent storage. In another embodiment of the invention, the network device state database may be implemented as an in-memory database with a copy of the network device state database being stored in persistent storage. In such cases, as changes are made to the in-memory database, copies of the changes (with a timestamp) may be stored in persistent storage. The use of an in-memory database may provide faster access to the contents of the network device state database.

Those skilled in the art will appreciate that while the term "database" is used above, the network device state database (130) may be implemented using any known or later developed data structure(s) to manage and/or organize the content in the network device state database.

In one embodiment of the invention, the state information from the individual network devices may be shared with the management system using an asynchronous replication mechanism. More specifically, when state information is changed in the network device, the changed state information is first stored in the network device state database, and then a copy of the changed state information is transmitted (via a push or pull mechanism) to the management system.

In one embodiment of the invention, one or more network device agents (132) interact with the network device state database (130). Each network device agent facilitates the implementation of one or more protocols, services, and/or features of the network device (106). Examples of network device agents, include, but are not limited to, a routing information base agent, a forwarding information base agent, and a simple network management protocol (SNMP) agent. Furthermore, each network device agent includes functionality to access various portions of the network device state database (130) in order to obtain the relevant portions of the state of the network device in order to perform various functions. Additionally, each network device agent includes functionality to update the state of the network device by writing new and/or updated values in the network device state database, corresponding to one or more variables and/or parameters that are currently specified in the network device.

The architecture of the system, the management system, and the network device is not limited to the components shown in FIGS. 1A-1C. Further, the system, management device, and network device may each include components not shown in FIGS. A, 1B and 1C, respectively.

Figure 2:
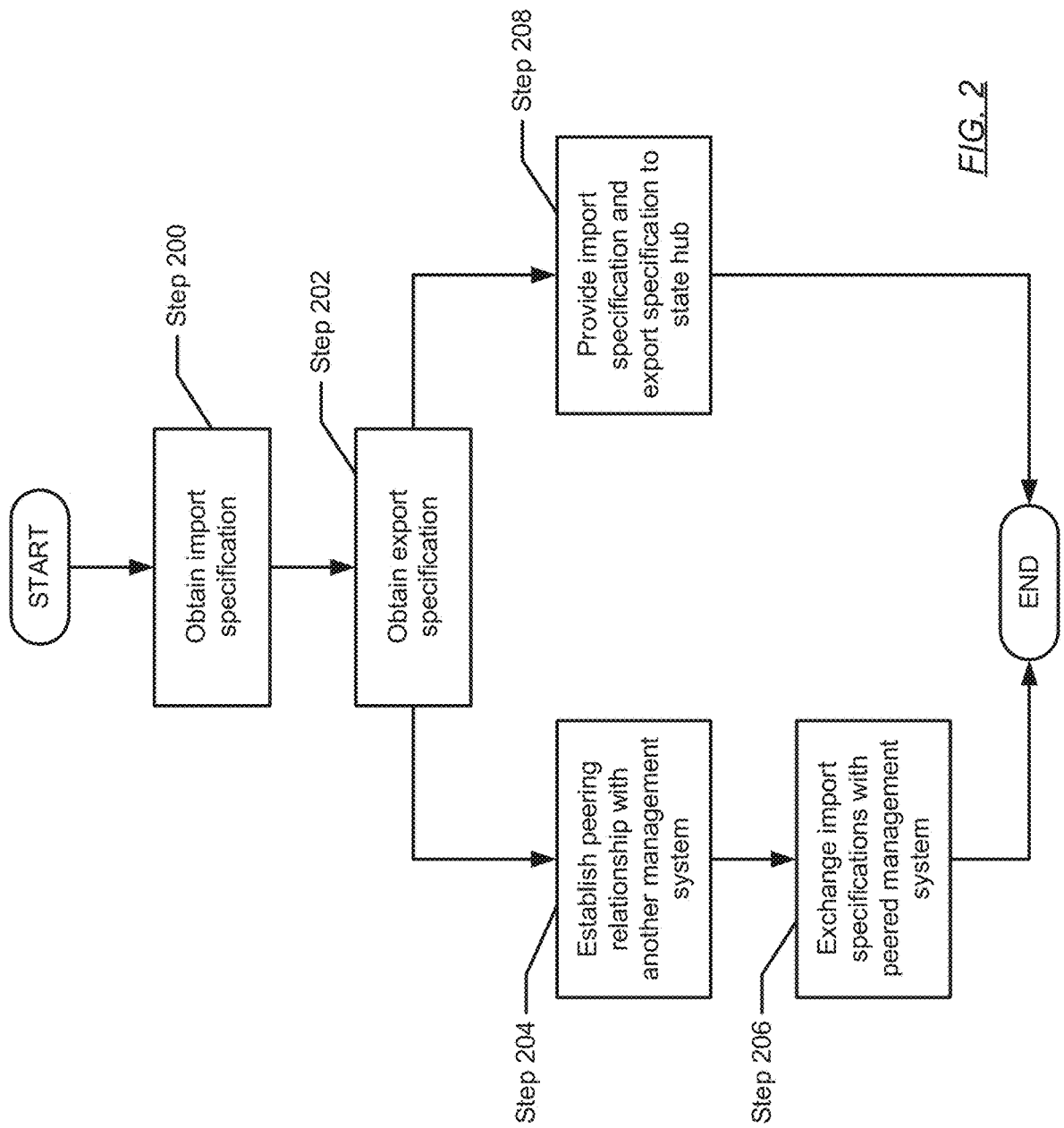
FIG. 2 shows a flowchart for setting up management systems in accordance with one or more embodiments of the invention.

FIGS. 2-4 show flowcharts in accordance with one or more embodiments of the invention. While the various steps in the flowcharts are presented and described sequentially, one of ordinary skill will appreciate that some or all of the steps may be executed in different orders, may be combined or omitted, and some or all steps may be executed in parallel. In one embodiment of the invention, the steps shown in FIGS. 2-4 may be performed in parallel with any other steps shown in FIGS. 2-4 without departing from the invention.

FIG. 2 shows a flowchart for setting up management systems in accordance with one or more embodiments of the invention. The method shown in FIG. 2 may be performed by a management system.

In step 200, the import specification for the management system is obtained by (or otherwise provided to) the management system. The import specification may be generated by a user (such as an administrator) and then provided, via a client device, to the management system. The import specification obtained in step 200 may be the initial import specification and may be subsequently modified, e.g., by a user via a client device and/or by another component in the system.

In step 202, the export specification for the management system is obtained by (or otherwise provided to) the management system. The export specification may be generated by a user (such as an administrator) and then provided, via a client device, to the management system. The export specification obtained in step 202 may be the initial export specification and may be subsequently modified, e.g., by a user via a client device and/or by another component in the system.

As discussed above, a given management system have may multiple import and export specifications. Accordingly, steps 200 and 202 may include obtaining more than one import and/or export specification.

Continuing with the discussion of FIG. 2, the management system may include functionality to directly establishing peering relationships with other management systems (see e.g., step 204-206) and/or establish a peering relationship with a state hub (see e.g., step 208). Peering relationships may be established with other management systems and/or the state hub in order to share NDSI between various management systems. By establishing a peering relationship, the management system provides the other management systems or the state hub with information (e.g., the management system's import and/or export specifications) about what NDSI the management system will export and what external NDSI (i.e., NDSI from other management systems), the management system will import. The management system may also provide additional information when establishing the peering relationship without departing from the invention.

Continuing with the discussion of FIG. 2, in step 204, the management system establishes a peering relationship directly with another management system. The establishment of the peering relationship may include establishing a communication channel with the other management system. The communication channel may be established using any known or later discovered mechanism that enables communication over a network (see e.g., FIG. 1A). In one embodiment of the invention, the communication channel may be a session between the two management systems and, in such cases, the management system may use an Internet Protocol (IP) address of the other management system in order to establish the communication channel. Further, depending on the implementation of the invention, the establishment of the communication channel may include an authentication by one or both of the management systems by the other management system. The authentication may be performed using any know or later discovered authentication process. Further, once established, the communication channel may only transmit NDSI (or other data) in an encrypted or secured format.

In step 206, after the communication channel has been established, the management system, via the communication channel, provides its import specification to the other management system and receives, via the communication channel, the other management system's import specification. The management system and the other management system may also exchange other information via the communication channel without departing from the invention.

Instead of establishing a communication channel and then exchanging the import specifications via the communication channel. The peering relationship may be established using a peering protocol. The following is a non-limiting example of a peering protocol that may be used by two management systems. Turning to the example, the management system may send a request message (which may be a unicast, multicast, or broadcast message) that includes an identifier of the management system, the import specification (and/or export specification), and a request to establish a peering relationship with another management system. In response to receiving the request message, the other management system may generate and send a response message that includes its own identifier and its import specification. In this manner, the aforementioned management systems may exchange their respective import specifications. If the request message is a unicast message or a multicast message, then the management system may have previously obtained, e.g., the IP address of the management system.

While steps 204-206 describe exchanging only the import specifications, step 204-206 may, in other embodiments of the invention, include exchanging the export specifications instead of the import specifications and/or exchanging the import specifications and the export specifications.

Steps 204-206 may be repeated to establish peering relationships with multiple management systems.

Returning to the discussion of FIG. 2, in step 208, instead of establishing a peering relationship with each individual management system, the management system may establish a peering relationship with a state hub. The peering relationship may be established with the state hub in the same or substantially the same manner as described above with respect to FIGS. 204-206. In one embodiment of the invention, the management system may have previously obtained the IP address of the state hub prior to attempting to establish a peering relationship with the state hub. Further, the management system may provide both its import and export specification to the state hub when establishing the peering relationship.

In one embodiment of the invention, the state hub may only be used to enable management systems to discover each other. In this embodiment, the management systems may establish a peering relationship with (or register with) the state hub where the management may (or may not) provide the import and/or export specifications to the state hub. Once registered, information about the management system is included within a data structure maintained by the state hub. Further, any management system (which may or may not be registered with the state hub) may access this data structure and/or issue a request to the state hub in order to determine what other management systems have registered with the state hub. Once a management system identifies another management system with which it wants to establishing a peering relationship, the management system may establish a direct peering relationship with the identified management system using the information about the management system stored in the state hub. See e.g., FIG. 2, Steps 204, 206.

Figure 3A:
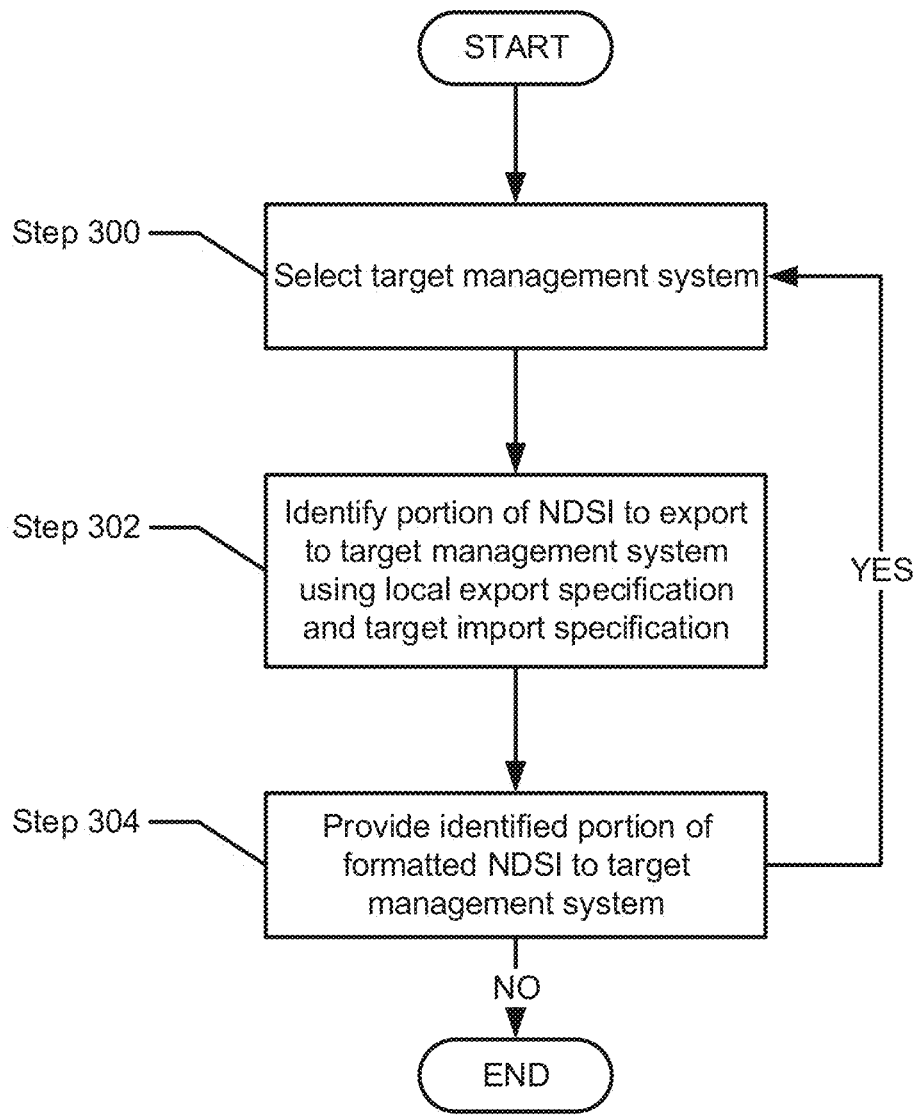
FIG. 3A shows a flowchart for exchanging network device state information in accordance with one or more embodiments of the invention.

After the management system has established a peering relationship(s) with at least one other management system and/or the state hub, the management system may import and/or export NDSI in accordance with FIGS. 3A-3C.

FIG. 3A shows a flowchart for exchanging network device state information (NDSI) in accordance with one or more embodiments of the invention. FIG. 3A may be performed when the management system has directly established a peering relationship with at least one other management device.

In step 300, a target management system is selected. The target management system may be any management system to which the management system has previously established a peering relationship.

In step 302, the portion of the local NDSI to export to the target system is identified using the export specification of the management system and the import specification of the target management system. In one embodiment of the invention, an intersection operation may be performed using the aforementioned import specification and export specification to identify the specific NDSI to be exported to the target management system. Depending on the granularity of the aforementioned import and export specifications, the result of performing an intersection operation on the import and export specifications may be specific NDSI or a specific class or category of NDSI. In the latter scenario, a query may be generated based on the results of the intersection operation and issued to the management system database in order to identify the specific local NDSI to export.

In step 304, the local NDSI identified in step 302 is provided to the target management system. If the local NDSI is stored in the management system database in a local format, then the management system, using the translator, may re-format the local NDSI using the common NDSI model. The resulting re-formatted NDSI may then be provided to the target management system.

The method shown in FIG. 3A may be performed (serially or in parallel) for each of the target management systems that have a peering relationship with the management system.

In another embodiment of the invention, the management system monitor changes to the local NDSI in the database and, if the changes in the local NDSI corresponds to NDSI that may be exported to one or more target management systems, the management system may obtain the local NDSI from the management system database and provide it to the target management system(s) in the same (or substantially similar) manner as described in step 306. The aforementioned functionality may be implemented, for example, using one or more standing queries that are created using the import and export specifications.

The method shown in FIG. 3A describes a mechanism in which the management system periodically "pushes" local NDSI to the target management systems. In other embodiments of the invention, the management system may provide local NDSI to the target management systems via a "pull" mechanism. In such scenarios, the target management system may have previously obtained (when the peering relationship was established) the export specification from the management system. Target management system may then perform an intersection operation between its import specification and the export specification of the management system (i.e., the management system from which it is attempting to import the NDSI). The result of the intersection operation is the local NDSI that the target management system may request from the management system. The target management system may issue a request based on the aforementioned result to the management system. If the management system includes the requested local NDSI, then the management system will provide the local NDSI to the target management system. In another embodiment of the invention, the target management system may obtain all the local NDSI that the management system is exporting (i.e., the local NDSI that is specified in the export specification) and then perform the aforementioned intersection operation between its import specification and the export specification of the management system. Said another way, in this embodiment the filtering of the local NDSI of the management system is perform on the target management system.

FIGS. 3B-3C shows a flowchart for exchanging network device state information (NDSI) using a state hub in accordance with one or more embodiments of the invention.

More specifically, FIG. 3B shows a method for providing NDSI to a state hub.

As discussed above, the management system may be receiving and storing local NDSI in the management system database.

In step 320, if the local NDSI is stored in a local format, then the local NDSI is processed, e.g., using the translator and the common NDSI model, to obtain formatted NDSI. The process then proceeds to step 322.

In step 322, the local NDSI (formatted to conform to the common NDSI model (which may or may not have been formatted in step 320)) is provided to the state hub. The local NDSI provided to the state hub may only be the local NDSI that is specified in the management system's export specification(s).

Turning FIG. 3C, FIG. 3C shows a method for providing NDSI target management systems using the state hub. The method shown in FIG. 3C may be performed by the state hub.

In step 330, the state hub receives the formatted NDSI from management system (hereafter referred to as the source management system).

In step 332, a target management system is selected. The target management system may be any management system to which the state hub has previously established a peering relationship.

In step 334, the portion of the received NDSI to export to the target system is identified using the export specification of the management system and the import specification of the target management system. In one embodiment of the invention, an intersection operation may be performed using the aforementioned import specification and export specification to identify the specific NDSI to be exported to the target management system. Depending on the granularity of the aforementioned import and export specifications, the result of performing an intersection operation on the import and export specifications may be specific NDSI or a specific class or category of NDSI. In the latter scenario, a query may be generated based on the results of the intersection operation and issued to the management system database in order to identify the specific local NDSI to provide to the target management system.

In step 336, the NDSI identified in step 334 is provided to the target management system. If the NDSI is stored in the state hub in a local format, then the state hub may re-format the NDSI using the common NDSI model. The resulting re-formatted NDSI may then be provided to the target management system.

The method shown in FIG. 3C may be performed (serially or in parallel) for each of the target management systems that have a peering relationship with the state hub.

In another embodiment of the invention, the state hub may perform the method shown in FIG. 3C periodically, each time NDSI is received from a management system, or after a certain amount of NDSI is received from one or more management systems.

In another embodiment of the invention, the state hub may monitor the NDSI it receives and, if the received NDSI corresponds to NDSI that may be exported to one or more target management systems, the state hub may provide it to the appropriate target management systems in the same (or substantially similar) manner as described in step 336. The aforementioned functionality may be implemented, for example, using one or more standing queries that are created using the import and export specifications.

The method shown in FIG. 3C describes a mechanism in which the state hub periodically "pushes" NDSI to the target management systems. In other embodiments of the invention, the management system may provide local NDSI to the target management systems via a "pull" mechanism. In such scenarios, the target management system may issue, to the state hub, a request for NDSI based on its import specification. If the state hub includes the requested NDSI, then the state hub will provide the requested NDSI to the target management system. In another embodiment of the invention, the target management system may obtain all the local NDSI that state hub distributing and then perform the aforementioned intersection operation between its import specification and the export specification of the management system. Said another way, in this embodiment the filtering of the local NDSI received from the state hub is performed on the target management system.

While FIGS. 2-3C describe embodiments in which the state hub obtains the import and export specifications from the various management systems and then uses these import and/or export specifications in distributing the local NDSI that it receives, in other embodiments of the invention the state hub does not obtain the import or export specification and, as such, does not use these specifications as part of the local NDSI distribution. Specifically, in other embodiments of the invention, once a peering relationship is established between the management system and the state hub, the state hub: (i) receives any local NDSI that the management system exports and (ii) distributes the received local NDSI to all other management systems with which it has established a peering relationship. In this manner, the local NDSI exported from one management system is distributed to all other management systems that are registered with the state hub. When a given management system receives local NDSI from the state hub it may uses its import specification to determine which, if any, of the received local NDSI to import. In a variation of the above embodiment, after establishing a peering relationship with the state hub, the management system may receive information about which other management systems have also established peering relationships with the state hub. The management system may then use this information to select a subset of the other management systems from which to receive local NDSI. Once this selection is made, the state hub may only provide the given management system with the local NDSI from the selected subset of other management systems.

FIG. 4 shows a flowchart for processing NDSI in accordance with one or more embodiments of the invention. The method shown in FIG. 4 may be performed by a management system.

In step 400, NDSI is received from the state hub or another management system (also referred to in this flowchart as an external NDSI).

In step 402, if the external NDSI from the external management system is to be stored in the management system database using a local format or if the management system applications on the management system require the NDSI it processes to be in a local format, then in step 402, the external NDSI is formatted to generate locally-formatted external NDSI.

In step 404, the NDSI (which may include only the external NDSI (from one or more management systems) or a combination of local NDSI and external NDSI (from one or more management systems)) is processed using a management system application to generate a result. The result of the processing may vary based on the NDSI and the management system application. The result may be in the form of NDSI (or state), in the form of messages (or instructions), or any combination thereof. Non-limiting examples of results are described below in Example 1, Example 2, Example 3, and Example 4.

Depending on the NDSI that was processed and the management system application that processed the NDSI, the result may be directly used by the management system (see e.g., Step 406) or be provide to another component in the system (see e.g., Step 408). The actions performed in steps 406 and 408 may be collectively referred to as management actions.

In step 406, the result is used to initiate the configuration of one or more network devices in the management domain, i.e., the management domain in which the management system that performed the analysis on the NDSI is located. In one embodiment of the invention, the initiation of the configuration may be performed by updating one or portion portions of the NDSI in the management system database, where the updating triggers propagation of the changes to one or more network devices (as described in FIGS. 1A-1C).

Other mechanisms for initiating the configuration of the network devices may be performed without departing from the invention.

In step 408, the result is provided to another management system in another management domain. In one embodiment of the invention, the result may then be used to initiate the configuration of one or more network devices in that management domain (See e.g., FIG. 4B, step 406 and FIGS. 1A-1C).

Alternatively, the result may be provided (e.g., via an API) to a network appliance or network appliance system (described above). The result may then be used to configure the network appliance, initiate another action(s) on the network appliance and/or on the network appliance system.

The following describes four non-limit examples of embodiments of the invention. The examples are not intended to limit the invention.

Example 1—Configuring Network Devices

Consider a scenario in which there are two management domains (MD A, MD B), where each management domain includes its own management system (MS A, MS B). In this scenario, MS A may obtain NDSI (i.e., NDSI A) for the network devices it manages (network device set A) where NDSI A includes information about VTEP IP address learned/discovered by network device set A. MS A includes an export specification that specifies VTEP IP address and MS B includes an import specification that specifies VTEP IP address. In this scenario, MS A and MS B each establish a peering relationship with the state hub and, after the peering relationships have been established, NDSI A is exported to the state hub, which subsequently transmits the NDSI A to MS B.

MS B imports the NDSI A from the state hub and processes NDSI A to obtain the VTEP IP addresses learned by network device set A. MS B then uses the VTEP IP addresses learned by network device set A to augment the VTEP IP addresses already learned by network device set B (i.e., the network devices managed by MS B). In this manner, while network device set B may ultimately learn the VTEP IP address that were previously learned by network device set A, embodiments of the invention enable a more efficient mechanism to share information between management domains thereby reducing the time and overhead required to learn, in this example, the VTEP IP addresses of VTEPs used by network device sets A and B.

In one embodiment of the invention, the information in NDSI A may be processed by MS B in order to determine which portions of NDSI A to use to augment the VTEP IP addresses already learned by MS B. In this scenario, only a portion of NDSI A may be used to update MS B.

Example 2—Using Management System Application

Consider a scenario in which there are two management domains (MD A, MD B), where each management domain includes its own management system (MS A, MS B). In this scenario, MS A may obtain NDSI (i.e., NDSI A) for the network devices it manages (network device set A) where NDSI A includes information about the logical and physical connectivity between network devices in network device set A. MS A includes an export specification that specifies logical and physical connectivity and MS B includes an import specification that specifies the logical and physical connectivity. Accordingly, after a peering relationship has been established between MS A and MS B, NDSI A is exported to MS B.

In this scenario, a system administrator that is managing MD A and MD B wants to visualize the MD A but wants to use the topology visualizer that is in MS B. Accordingly, after NDSI A is imported by MS B, the administrator (via a client device) may analyze NDSI A using the topology visualizer in MS B. The results of the analysis (i.e., a topology visualization of MD A) may be provided to the client (via its user interface). In this manner, an administrator may use a vendor specific feature (e.g., a topology visualizer) for NDSI associated with set of network devices that is not managed by the vendor-specific management system. By enabling management systems to readily export and import NDSI from other management systems, an administrator may use vendor-specific features/software/hardware to manage network devices that are from different vendors.

Example 3—Configuring Network Appliances

Consider a scenario in which there are two management domains (MD A, MD B), where each management domain includes its own management system (MS A, MS B). In this scenario, MS A may obtain NDSI (i.e., NDSI A) for the network devices it manages (network device set A) where NDSI A includes information about server-to-port mappings learned/discovered by network device set A. MS A includes an export specification that specifies server-to-port mappings and MS B includes an import specification that specifies server-to-port mappings. Accordingly, after a peering relationship has been established between MS A and MS B, NDSI A is exported to MS B.

MS B imports and processes NDSI A to obtain the server-to-port mappings addresses learned by network device set A. MS B may then combine NDSI A with server-to-port mappings that have already learned by network device set B (i.e., the network devices managed by MS B).

A firewall configurer executing in MS B may then generate a firewall configuration using the combined NDSI. The resulting firewall configurations may then be sent (e.g., as messages or instructions), via an API, to the firewall (i.e., a network appliance). The firewall may subsequently be configured (or its configuration updated) using the provided firewall configurations generated by the firewall configurer.

In this manner, NDSI may be collected in individual management domains, aggregated by a single management system, and then used to configure a network appliance(s) that is used across the management domains. Embodiments of the invention enable the efficient aggregation of NDSI across multiple management domains in combination with the use of a single management system to coordinate the configuration of a network appliance that is used by multiple management domains.

Example 4—Providing State to Management System

Consider a scenario in which there are two management domains (MD A, MD B), where each management domain includes its own management system (MS A, MS B). In this scenario, MS A may obtain NDSI (i.e., NDSI A) for the network devices it manages (network device set A) where NDSI A includes information learned/discovered by network device set A. MS A includes an export specification that exports NDSI A and MS B includes an import specification that imports NDSI A. In this scenario, MS A and MS B each establish a peering relationship with the state hub and, after the peering relationships have been established, NDSI A is exported to the state hub, which subsequently transmits NDSI A to MS B.

MS B imports NDSI A from the state hub and processes NDSI A using a management system application that performs network segmentation. The result of the processing is proposed network segmentation for MS A. The proposed network segmentation is then provided to MS A. In this example, the current network segmentation in MS A may be consider local NDSI and the proposed network segmentation may be considered external NDSI. Accordingly, the external NDSI may be imported into MS A and then processed. In scenarios in which it is processed, MS A may: (i) use the external NDSI to configure one or more network devices in network device set A or (ii) determine that the external NDSI should not be used to update the configuration of any network device in network device set A.

In this manner, the management systems may receive NDSI (or more generally state) from another management system. The management system that received the NDSI may then generate new state (or new NDSI) based on the received state. The new state may then be transmitted back to the management system that sent the original NDSI. The management system which receives the new NDSI may then process the new NDSI to determine whether to update its configuration and/or the configuration of any other network device that it is managing.

Said another way, in one or more embodiments of the invention, the management system applications may process NDSI (which may be local NDSI, imported NDSI, or a combination thereof) and generate new NDSI. The new NDSI (or new state) may then be used by the management system on which the management system application is executing to configure one or more network devices managed by the management system and/or used by another management system to configure one or more network devices that is manages. In this embodiment, the new state that is generated by the management applications is only provided to the management systems and the management systems then process the new state in order to determine whether or not to use none, some, or all or the new state.

End of Examples

Figure 5:
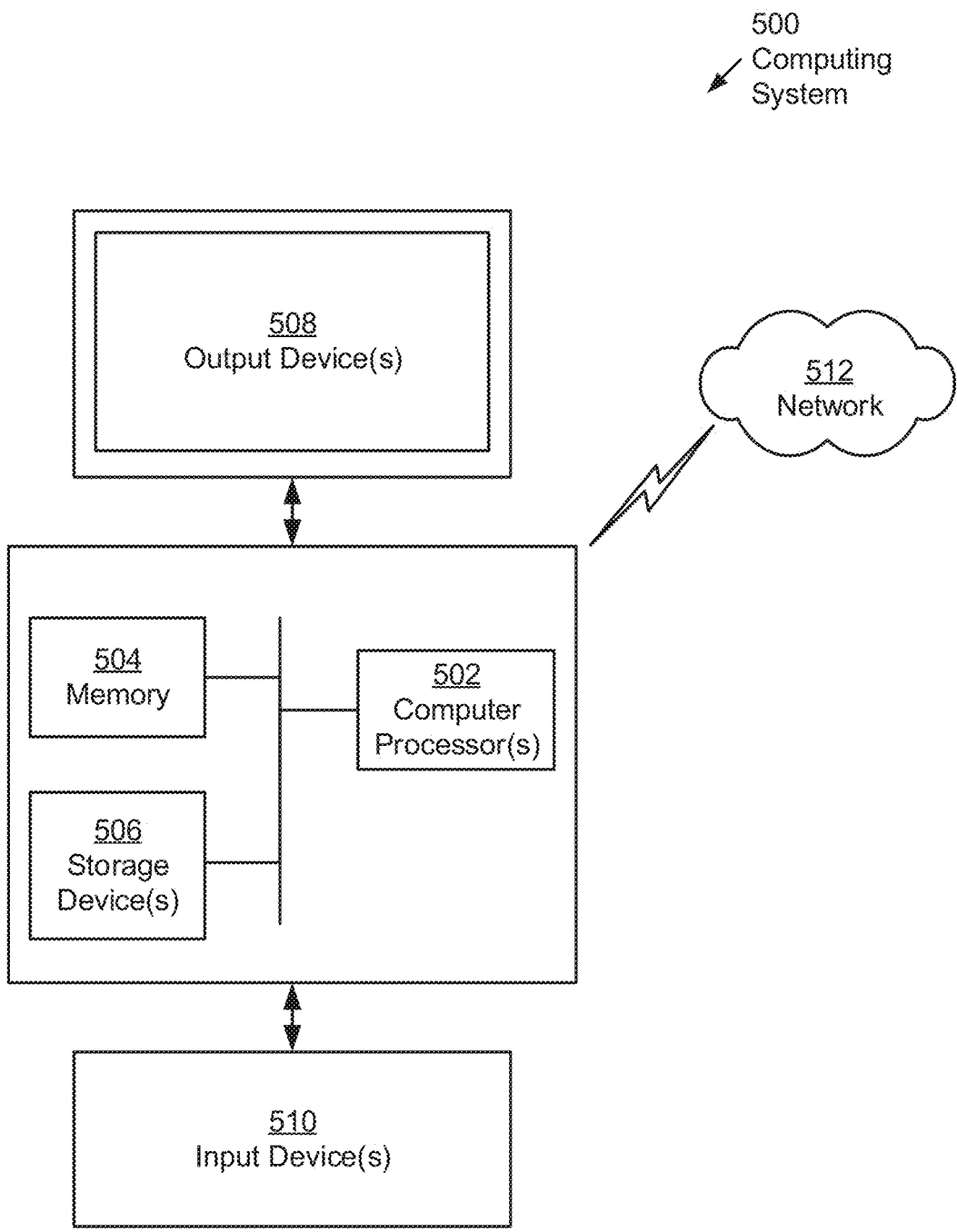
FIG. 5 shows a computing device in accordance with one or more embodiments of the invention.

Embodiments of the invention may be implemented on a computing device. Any combination of mobile, desktop, server, embedded, or other types of hardware may be used. For example, as shown in FIG. 5, the computing device (500) may include one or more computer processor(s) (502), associated memory (504) (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing device (500) may also include one or more input device(s) (510), such as a touchscreen, keyboard, mouse, microphone, touchpad, electronic pen, or any other type of input device. Further, the computing device (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing device (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing devices exist, and the aforementioned input and output device(s) may take other forms.

Software instructions in the form of computer readable medium program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, on or more elements of the computing device (500) may be located at a remote location and connected to the other elements over a network (512). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a plurality of network devices, comprising:
sending, by a first management system, an import specification to a state hub, wherein the import specification specifies a type of network device state information (NDSI) that the first management system permits to be imported from other management systems; and
in response to sending the import specification:
receiving, from the state hub, NDSI for the plurality of network devices that satisfies the import specification, wherein the NDSI comprises external NDSI of a second management system, wherein the NDSI is formatted in an external format matching the second management system, and wherein the NDSI is obtained by the second management system and provided to the state hub by the second management system;
processing, by the first management system, the NDSI to obtain a result; and
initiating, by the first management system, performance of a management action based on the result.

2. The method of claim 1, wherein in response to sending the import specification and prior to receiving the NDSI, the method further comprises:

issue a request to the state hub to identify other management systems that have previously communicated with the state hub, wherein the other management systems comprises the second management system.

3. The method of claim 1, wherein after receiving the NDSI but prior to processing the NDSI, the method further comprises:
formatting the NDSI to a local format matching the first management system.

4. The method of claim 1, wherein initiating performance of the management action comprises initiating a configuration of a network appliance, wherein the configuration is based on the result, and wherein the network appliance is managed by the first management system.

5. The method of claim 4, wherein initiating the configuration of the network appliance comprising sending at least a portion of the result to the network appliance via an application programming interface (API) of the network appliance.

6. The method of claim 4, wherein the network appliance is a firewall, and wherein the firewall is used by the plurality of network devices.

7. A non-transitory computer readable medium comprising instructions which, when executed by a computer processor, enables the computer processor to perform a method for managing a plurality of network devices, comprising:
sending, by a first management system, an import specification to a state hub, wherein the import specification specifies a type of network device state information (NDSI) that the first management system permits to be imported from other management systems; and
in response to sending the import specification:
receiving, from the state hub, NDSI for the plurality of network devices that satisfies the import specification, wherein the NDSI comprises external NDSI of a second management system, wherein the NDSI is formatted in an external format matching the second management system, and wherein the NDSI is obtained by the second management system and provided to the state hub by the second management system;
processing, by the first management system, the NDSI to obtain a result; and
initiating, by the first management system, performance of a management action based on the result.

8. The non-transitory computer readable medium of claim 7, wherein in response to sending the import specification and prior to receiving the NDSI, the method further comprises:
issue a request to the state hub to identify other management systems that have previously communicated with the state hub, wherein the other management systems comprises the second management system.

9. The non-transitory computer readable medium of claim 7, wherein after receiving the NDSI but prior to processing the NDSI, the method further comprises:
formatting the NDSI to a local format matching the first management system.

10. The non-transitory computer readable medium of claim 7, wherein initiating performance of the management action comprises initiating a configuration of a network appliance, wherein the configuration is based on the result, and wherein the network appliance is managed by the first management system.

11. The non-transitory computer readable medium of claim 10, wherein initiating the configuration of the network appliance comprising sending at least a portion of the result to the network appliance via an application programming interface (API) of the network appliance.

12. The non-transitory computer readable medium of claim 10, wherein the network appliance is a firewall, and wherein the firewall is used by the plurality of network devices.

13. A method for managing a plurality of network devices, comprising:
receiving, by a state hub, network device state information (NDSI) obtained by a second management system, wherein the NDSI comprises external NDSI of the second management system, and wherein the NDSI is formatted in an external format matching the second management system; and
after receiving the NDSI from the second management system:
receiving, by the state hub, an import specification from a first management system, wherein the import specification specifies a type of NDSI that the first management system permits to be imported from other management systems, and
determining, by the state hub, that a first portion the NDSI received from the second management system satisfies the import specification; and
in response to receiving the import specification:
sending, by the state hub to the first management system, the first portion of the NDSI received from the second management system for processing by the first manaaement system to obtain a result used for initiating a manaaement action.

14. The method of claim 13, wherein prior to receiving the NDSI from the second management system, the method further comprises:
establishing a first peering relationship with the second management system.

15. The method of claim 14, wherein after receiving the NDSI from the second management system, the method further comprises:
establishing a second peering relationship with a third management system; and
in response to establishing the second peering relationship:
sending the NDSI received from the second management system to the third management system.

16. The method of claim 15, wherein establishing the second peering relationship with the third management system is made in response to a first determination that a duration of time has elapsed.

17. The method of claim 13, wherein the NDSI sent to the first management system comprises a subset of the NDSI received from the second management system.

18. The method of claim 17, wherein the subset of the NDSI comprises the type of NDSI that the first management system permits to be imported from other management systems.

* * * * *

UNITED STATES PATENT AND TRADEMARK OFFICE
CERTIFICATE OF CORRECTION

| | |
|---|---|
| PATENT NO. | : 11,757,715 B2 |
| APPLICATION NO. | : 16/953990 |
| DATED | : September 12, 2023 |
| INVENTOR(S) | : Kenneth James Duda |

It is certified that error appears in the above-identified patent and that said Letters Patent is hereby corrected as shown below:

In the Claims

At Column 24, Lines 33-34, replace "manaaement" with –management–

At Column 24, Line 35, replace "manaaement" with –management–

Signed and Sealed this
Seventeenth Day of October, 2023

Katherine Kelly Vidal
*Director of the United States Patent and Trademark Office*